United States Patent
Sassin et al.

(12) 
(10) Patent No.: US 6,456,619 B1
(45) Date of Patent: Sep. 24, 2002

(54) METHOD AND SYSTEM FOR SUPPORTING A DECISION TREE WITH PLACEHOLDER CAPABILITY

(75) Inventors: Michael Sassin, San Jose; Neal J. King, Oakland; Matthew T. Dean, Campbell; Eli Jacobi, Palo Alto, all of CA (US)

(73) Assignee: Siemens Information and Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 08/985,374

(22) Filed: Dec. 4, 1997

(51) Int. Cl.[7] .............................................. H04L 12/66
(52) U.S. Cl. ...................................... 370/356; 379/67.1
(58) Field of Search ............................... 370/254, 255, 370/256, 351, 356, 524; 379/266, 67.1, 68, 69, 88.01, 88.03, 88.04, 93.2; 707/104; 706/60

(56) References Cited

U.S. PATENT DOCUMENTS

| | | | |
|---|---|---|---|
| 4,932,021 A | | 6/1990 | Moody ......................... 370/54 |
| 5,537,470 A | | 7/1996 | Lee ............................. 379/266 |
| 5,632,007 A | * | 5/1997 | Freeman ....................... 706/59 |
| 5,802,526 A | * | 9/1998 | Fawcett et al. ............. 707/104 |
| 5,867,494 A | * | 2/1999 | Krishnaswamy et al. ... 370/352 |
| 6,016,336 A | * | 1/2000 | Hanson ..................... 379/88.23 |
| 6,067,552 A | * | 5/2000 | Yu ............................... 707/501 |

* cited by examiner

*Primary Examiner*—Chau Nguyen
*Assistant Examiner*—Alexander O. Boakye

(57) ABSTRACT

A system and method for supporting an interactive decision tree with placeholder capability include an interactive decision tree-based expert unit with an input enabled to receive user data that includes a user identification and with an output enabled to transmit system data. A memory is connected to the expert unit for storing the system data. Optionally, the user memory stores the identification and an associated decision tree node identifier representing a node in the decision tree visited by a user prior to termination of a communications link between the expert unit and the user. A device is provided for accessing the decision tree node identifier from the memory utilizing the associated user identification, so that a connecting device can automatically connect the user to a node within the decision tree based solely upon the user identification. Alternatively, the decision tree node identifier is transmitted to the user. Upon reconnecting to the expert unit, the user transmits the node identifier to the expert unit to reconnect to the decision tree at the node represented by the node identifier.

20 Claims, 3 Drawing Sheets

METHOD AND SYSTEM FOR SUPPORTING A DECISION TREE WITH PLACEHOLDER CAPABILITY

BACKGROUND OF THE INVENTION

The invention relates generally to a method and system for use in data communications, and more specifically to a method and system for supporting a decision tree with placeholder capability.

DESCRIPTION OF THE RELATED ART

A decision tree can be mapped out into a tree-like structure wherein a node is located at the junction of any two or more branches. Starting at a root node, a user is presented with at least two different options, each of the options leading to at least two other options. The user navigates sequentially through the various nodes of the decision tree to ultimately arrive at a desired service. An automated interactive decision tree has many applications, including technical product support, automated banking, financial reporting services, airline scheduling and reservations, and stock and bond quotations.

An exemplary application of a complex interactive decision tree is a technical product support decision tree. A customer is greeted upon entering the tree with a prerecorded message, prompting the customer to choose from a menu of options, perhaps representing different categories of potential product problems. At each successive level, the scope of the menu options narrows as the problem becomes better defined. When the problem is sufficiently defined, the customer might be directed to perform some troubleshooting procedure on the product and then inform the decision tree of the results by selecting from a menu of possible results. Use of an interactive decision tree in this manner reduces the amount of time which a customer support representative is required to spend elucidating the problem through conversation with the customer. Additionally, the customer can subsequently be transferred to a customer service representative qualified to assist with the problem, thereby saving the customer the aggravation of having to explain the problem repeatedly before being connected to a qualified customer representative. However, the customer might be required to disconnect from the interactive decision tree in order to most effectively perform the troubleshooting operations. Upon reconnecting to the decision tree, the customer is required to navigate through the numerous nodes previously traversed in order to reach the node at which the customer departed upon the termination of the first connection.

U.S. Pat. No. 4,932,021 to Moody describes a path learning feature for a type of interactive decision tree called an interactive voice response (IVR) unit, wherein the IVR is programmed to recognize a path of a user within the IVR. Each node in the IVR is assigned a weight value, and each time a user visits a node, a register in the IVR records the visit by adding the value of that node to a corresponding field in a profile of the user. When a field in the profile of a user has exceeded a threshold value, then the user is given the option of advancing directly to the corresponding node without having to traverse the intermediate nodes. While the path learning feature is valuable for expediting a user through a path frequently traveled by the user, the threshold feature is unnecessary to advance a user returning to the decision tree after a single prior visit. Consequently, the IVR performs unnecessary threshold procedures in the case of a user wishing to advance to a node visited by the user on a single prior occasion, thereby increasing the complexity of the system without providing any increase in performance.

U.S. Pat. No. 5,537,470 to Lee describes a method and apparatus for handling in-bound telemarketing calls in which an initial call is routed to a particular agent and a caller identifier is stored for a predetermined time interval in a memory together with an agent identifier. A subsequent call by the same caller within the predetermined time interval is routed to the same agent on the basis of the stored data from the first call. This method for handling in-bound telemarketing calls is useful for reconnecting a caller to a particular agent in a system wherein the caller was previously connected directly to that particular agent. However, the method is not well suited for advancing a caller to a previously visited node in a decision tree subsequent to the caller having traversed multiple different nodes.

What is needed is a method and system for automatically advancing a user of an interactive decision tree system to a node in the decision tree based upon anticipating a desired navigation without requiring multiple prior visits to the system.

SUMMARY OF THE INVENTION

A method for implementing an interactive decision tree protocol includes accepting a first request from a user to establish a first bidirectional communications link. The user is connected to an interactive decision tree-based expert unit which supports a decision tree. The user is presented with a series of option sets, each option within a set determining a subsequent set of options, -each option'set defining a node on the decision tree, and an assembly of all interrelated option sets defining the decision tree. A request is received from the user to exit the decision tree and the user is assigned a decision tree node identifier based upon the node last visited by the user prior to the exit request. The expert unit receives a subsequent request from the user to re-enter the decision tree and the user is automatically reconnected to a node in the decision tree based solely on the decision tree node identifier.

One aspect of the above-described method calls for storing a user identification and the decision tree node identifier associated with the user identification in a memory connected to the expert unit so that upon identification of the user by the expert unit, the user can be provided with an option to reconnect to the decision tree at a node indicated by the decision tree node identifier. Another aspect of the invention calls for transmitting the decision tree node identifier information to the user for storage by the user. The user transmits the decision tree node identifier back to the expert unit when the user wishes to re-enter the decision tree at a node indicated by the node identifier.

A system for implementing an interactive decision tree protocol includes the interactive decision tree-based expert unit having an input and an output, the input being enabled to receive user data from a remotely located user, the user data including the user identification, and the output being enabled to transmit system data. The memory is connected to the expert unit for storing the system data and the user identification with the associated decision tree node identifier representing a node in the decision tree visited by the user prior to termination of a communications link between the user and the expert unit. A device is provided for accessing the user identification with the corresponding decision tree node identifier from the memory, and a connecting device is provided for automatically connecting the user to the node within the decision tree based solely upon the decision tree node identifier.

DETAILED DESCRIPTION

Figure 1:
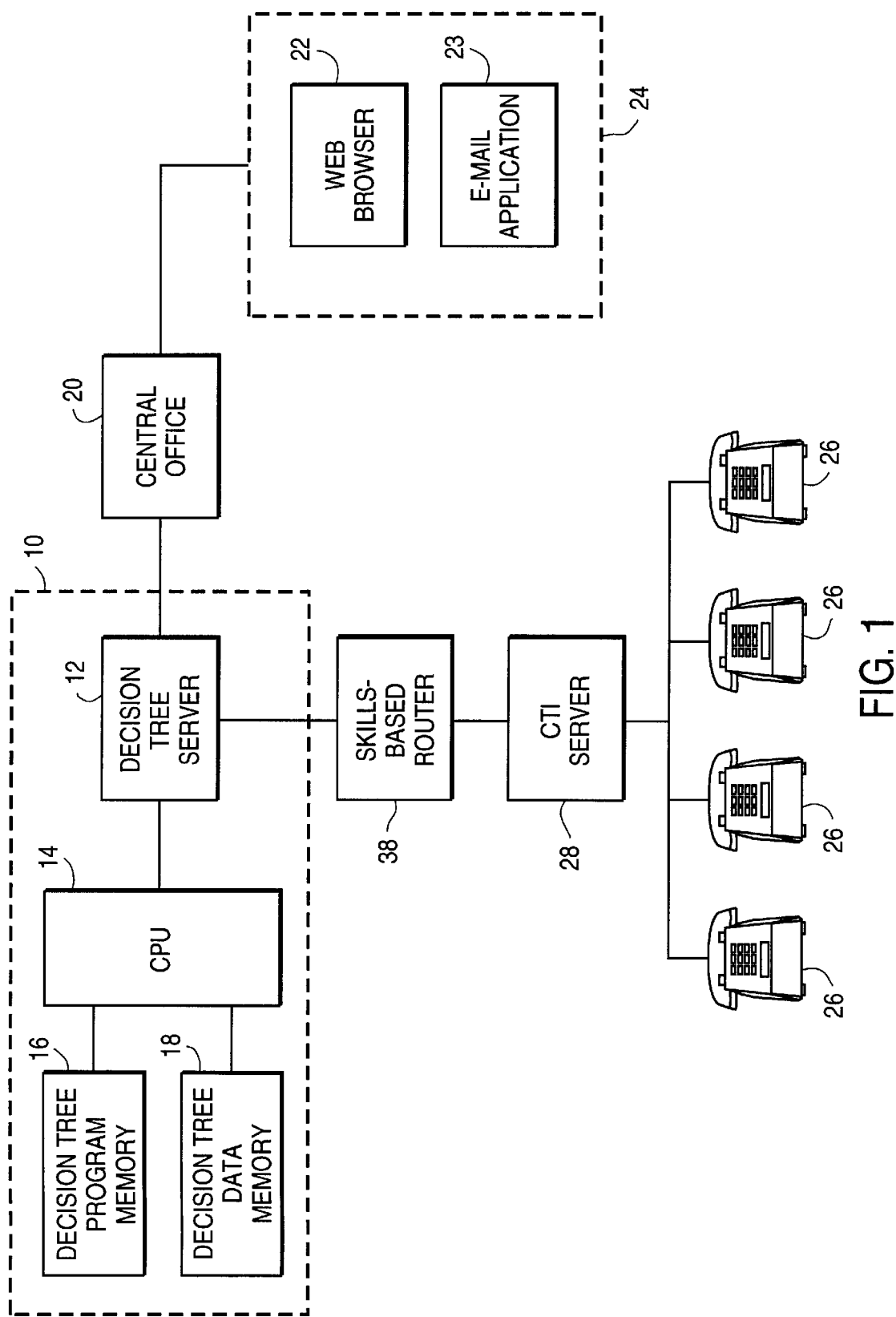
FIG. 1 is a block diagram of an Internet-based embodiment of an interactive decision tree system.

With reference to FIG. 1, an embodiment of an interactive decision tree system 10 is illustrated wherein the interactive decision tree system communicates with a user of the system via either an interactive web based system (IWBS) or an interactive e-mail response system. A decision tree server 12 executes a protocol to facilitate communication between the interactive decision tree system 10 and a user-operated computer 24. In the IWBS embodiment, the decision tree server 12 executes a hyper-text transfer protocol (HTTP), while in the interactive e-mail embodiment the decision tree server 12 executes a simple mail transfer protocol (SMTP). The decision tree server 12 receives data from the user-operated web browser 22 that operates on the user-operated terminal 24 (e.g. computer) and a central office 20. Alternatively, the user-operated computer might be connected to a decision tree server via a wide area network (WAN) in which the decision tree server 12 receives data from a server within a node of the WAN. The decision tree server 12 is connected to a central processing unit (CPU) 14 to transfer data received from the user-operated computer 24 to the CPU 14. The CPU, in turn, is connected to a decision tree program memory 16, which stores the decision tree program executed by the CPU. In executing the decision tree program, the CPU 14 accesses decision tree data stored in a decision tree data memory 18. The decision tree data includes the configuration of nodes which collectively constitute the decision tree, the text of the options which collectively constitute each node, decision tree node identifiers, a different node identifier corresponding uniquely to each node in the decision tree, and a set of service representative skills for each node in the tree for use by a skills-based router 38. The decision tree server 12 is also connected to multiple service representative-operated telephones 26 via the skills-based router 38 and a computer-telephony integration (CTI) server 28 to facilitate transmission of user decision tree path data to the telephones 26, to establish a call back time when a service representative will place a telephone call to the user, and to place the outbound call to the user.

In the IWBS embodiment, the user initiates contact with the interactive decision tree system by using the interactive decision tree universal resource locator (URL) to cause the web browser 22 to access the decision tree server 12. The decision tree server 12 alerts the CPU 14 upon establishment of a communications link with the user-operated computer. In response, the CPU 14 accesses a "homepage" file from the data memory 18 which contains a first node in the decision tree and signals the decision tree server 12 to transmit the file to the user-operated computer via the web browser 22. In the preferred embodiment, the CPU 14 assigns an identification to the user at the same time. The user identification might simply be the e-mail address of the user. The CPU stores the user identification in the data memory 18 along with subsequently generated data representing a communication history between the user and the interactive decision tree system. Alternatively, the CPU might delay assigning the user a user identification until the user communicates a desire to exit the decision tree.

As described above, the homepage includes several options which constitute a root node in the decision tree. By selecting one of the options, the user enters into the decision tree. The user might select an option by clicking an icon representing that option using a mouse. Selection of that option causes the web browser 22 to transmit a message to the decision tree server 12 indicating the selection. The CPU 14 then accesses a file from the data memory 18 representing the subsequent node determined by the option selected by the user and causes the decision tree server 12 to transmit the file to the web browser 22 on the user-operated computer 24. The user navigates through the decision tree in this manner until the user reaches a node providing a desired service, the user disconnects from the decision tree, or the user requests a call back from a service representative.

In the interactive e-mail embodiment of the invention, the user establishes a communications link with the interactive decision tree system 10 by transmitting an e-mail message from an e-mail application 23 at the computer 24 to the decision tree server 12. The decision tree server then transmits an e-mail message to the user-operated computer with options embedded into the message which represent the first node on the decision tree. The decision tree system can assign a user identification to the user at this point in the same manner as the described above in the IWBS embodiment or, alternatively, the decision tree system might wait until the user is prepared to disconnect from the system before assigning a user identification. The user navigates through the e-mail embodiment of interactive decision tree system 10 in an analogous manner to the IWBS embodiment. The interactive decision tree system 10 transmits e-mail messages to the user with embedded options, one of which the user selects. The user transmits a message indicating the selection using the e-mail application 23 and, in turn, the interactive decision tree transmits a responsive e-mail message containing the options of the subsequent node in the decision tree. This exchange between the user and the interactive decision tree unit continues until the user reaches a node providing the desired service, the user disconnects from the system, or the user requests a call back from a service representative.

Preferably, both the IWBS and the interactive e-mail embodiments of the interactive decision tree are configured to perform natural language processing utilizing a configurable parser for a limited domain. The user transmits to the CPU 14 a brief text description of the problem for which the user seeks a solution through interaction with the decision tree system 10. Utilizing the configurable parser, the CPU 14 is able to extract key information from the text description including the name of the user, a time when the user can be called back, and the general subject for which the user requires assistance. The CPU 14 can use this information for several purposes. The name and telephone number of the user along with the time for a call back can be transmitted to the CTI server 28 so the CTI server can place a call to the user. The same information, together with the subject matter of the problem, is transmitted to a service representative to enable the service representative to be prepared for a conversation with the user. The subject matter data can also be used to connect the user to a node in the decision tree interior to the first node. The configurable parser can narrow the scope of the problem and thereby enable the user to bypass the preliminary nodes in the decision tree which serve to accomplish the same problem narrowing function.

Alternatively, both the IWBS and the interactive e-mail embodiments of the interactive decision tree system 10 can be configured to perform a keyword analysis of the free-text description before connecting the user to a first node in the decision tree. The user transmits to the CPU 14 a brief text description of the problem for which the user seeks a solution through interaction with the interactive decision tree system 10. The CPU 14 searches files associated with the various nodes stored in the data memory 18 which contain keywords descriptive of the service provided at each node of the tree. The CPU 14 then causes the decision tree server 12 to transmit to the user those files which contain keywords found in the free-text description transmitted by the user. The user can select the most pertinent node utilizing the node description files. Alternatively, the CPU 14 might select the node in the decision tree from which the user will begin. At every node in the tree, the user is provided with the option of performing a free-text search to attempt to relocate to a more appropriate node in the decision tree.

In some instances, in both the IWBS and the interactive e-mail embodiments, a node will request information from the user which requires the user to expend a significant period of time accessing the information. For instance, the user might be interacting with a decision tree system operated by the government for providing income tax information. A node in the tree might request specific information about income which requires the user to search financial records to find the requested information. Rather than tie up the line or incurring additional connection service charges by maintaining the connection between the user and the interactive decision tree, the user is assigned a decision tree node identifier which enables the user to disconnect from the system. Upon presenting the decision tree node identifier to the interactive decision tree system 10 after reconnecting to the system 10, the user is given the option to advance directly to the last-visited node automatically.

The node identifier can have an important association with the user identification depending on whether the interactive decision tree stores the user identification in the data memory 18 or transmits the user identification to the user. In the latter case, the node identifier serves both as a user identification and the node identifier. There is no need for a separate user identification because, when the user reconnects to the interactive decision tree system, the identity of the user is irrelevant to the interactive decision tree system and only the node within the decision tree to which the user wishes to advance is of significance. Upon electing to disconnect from the decision tree, the interactive decision tree system 10 transmits a node identifier to the user corresponding to the node last visited by the user. The homepage of the IWBS embodiment, and the first e-mail message transmitted by the decision tree server 12 in the interactive e-mail embodiment, include an option allowing the user to enter the node identifier. The user enters the node identifier, transmits the node identifier via the user server 22, and the interactive decision tree system automatically advances the user to the interior node represented by the node identifier.

In the case in which the interactive decision tree system 10 stores the user identification in the data memory 18, the decision tree program stored in the program memory 16 provides instructions executed by the CPU 14 to uniquely associate the user identification with the node identifier, enabling advancement of the user directly to the node represented by the node identifier. The interactive decision tree system 10 assigns the user identification either upon establishment of the communications link or upon receiving notification that the user wishes to exit the decision tree. At each node in the decision tree is an option to disconnect from the tree. Upon selecting the disconnect option, the CPU 14 stores the user identification in the data memory 18. As previously mentioned, the user identification might be the e-mail address of the user. Upon reconnecting, the user either enters the user identification, or the decision tree server 12 might communicate the e-mail address of the user to the CPU 14 automatically upon establishment of a second communications link by the user. The CPU 14 accesses the data memory to determine whether a node identifier has been assigned to the user identification. If the user identification has been assigned a node identifier, the user is provided with the option of advancing directly to the node represented by the node identifier.

Optionally, the user is assigned a task identifier at the same time that a node identifier is assigned. The task identifier assists a user who has multiple ongoing interactions with the interactive decision tree system 10 to reconnect to the decision tree at a particular node of interest on the decision tree. Upon selecting a disconnect option at a node within the decision tree, after the CPU 14 has stored the node identifier in the data memory 18, the user is given the option of entering a task identifier which assists the user in recalling the interaction with which the node identifier is associated. For instance, continuing with the income tax interactive decision tree system discussed above, a user might have questions regarding the tax liability of the user for the years 1993, 1994 and 1995. To assist the user in determining which tax issue is associated with which node identifier, the interactive decision tree system 10 provides the user with the opportunity to enter a task identifier to assist the user in making the correct association on the next connection to the system by the user. Alternatively, the data memory 18 stores a written description associated with each node in the decision tree which serves as a task identifier. Upon the user reconnecting to the interactive decision tree system, the system transmits the written description of each node identifier associated with the ultimate nodes visited by the user on prior occasions. By reading the written descriptions of the various nodes, the user decides which of the previously visited nodes to which to reconnect.

Service representative-operated telephones 26 are connected to the decision tree server via a computer/telephony integration (CTI) server 28. Each node of the decision tree has an option to connect to a service representative. Upon selecting the connect-to-service-representative option, the decision tree server connects the user to the next available service representative. The CPU 14 causes the decision tree server to transmit the decision tree node identifier, the decision tree history, and the telephone number of the user to the CTI server 28. The CTI server is optionally configured to provide skills-based routing utilizing, for instance, an adjunct processor server to the ROLM ResumeRouting linked via a high speed CTI connection manufactured by Siemens. Preferably, a service representative skills set is associated with each node of the decision tree and is stored in the data memory 18. The skills-based router 38 uses the skills set data to select an agent qualified to assist the user. Alternatively, the decision tree node identifier and the decision tree path of the user can be analyzed to route the call to a service representative with the appropriate skills to assist the user. The CTI server 28 accesses a database (not shown) to determine a time when the service representative is able to call back the user. Upon selecting a time, the CTI server 28 transmits this information to the decision tree server 12, which transmits the information to the user in an e-mail message. If the selected time is not agreeable to the user, the user transmits a message declining the selected time, and a negotiation between the user and the CTI server 28 begins toward selection of a mutually agreeable call back time.

Alternatively, service representative-operated computers, not shown, are connected to the decision tree server instead of service representative-operated telephones 26. The service representatives complement the interactive decision tree system 10 by providing service to users who were unable to arrive at a solution through interaction with the interactive decision tree system. Possible connections between the user and a service representative include, but are not limited to, an interactive e-mail connection, an application sharing software connection supported by T.120 protocol, an Internet Protocol (IP) telephony connection supported by H.323 protocol, or a chat connection (text-based conversation).

Figure 2:
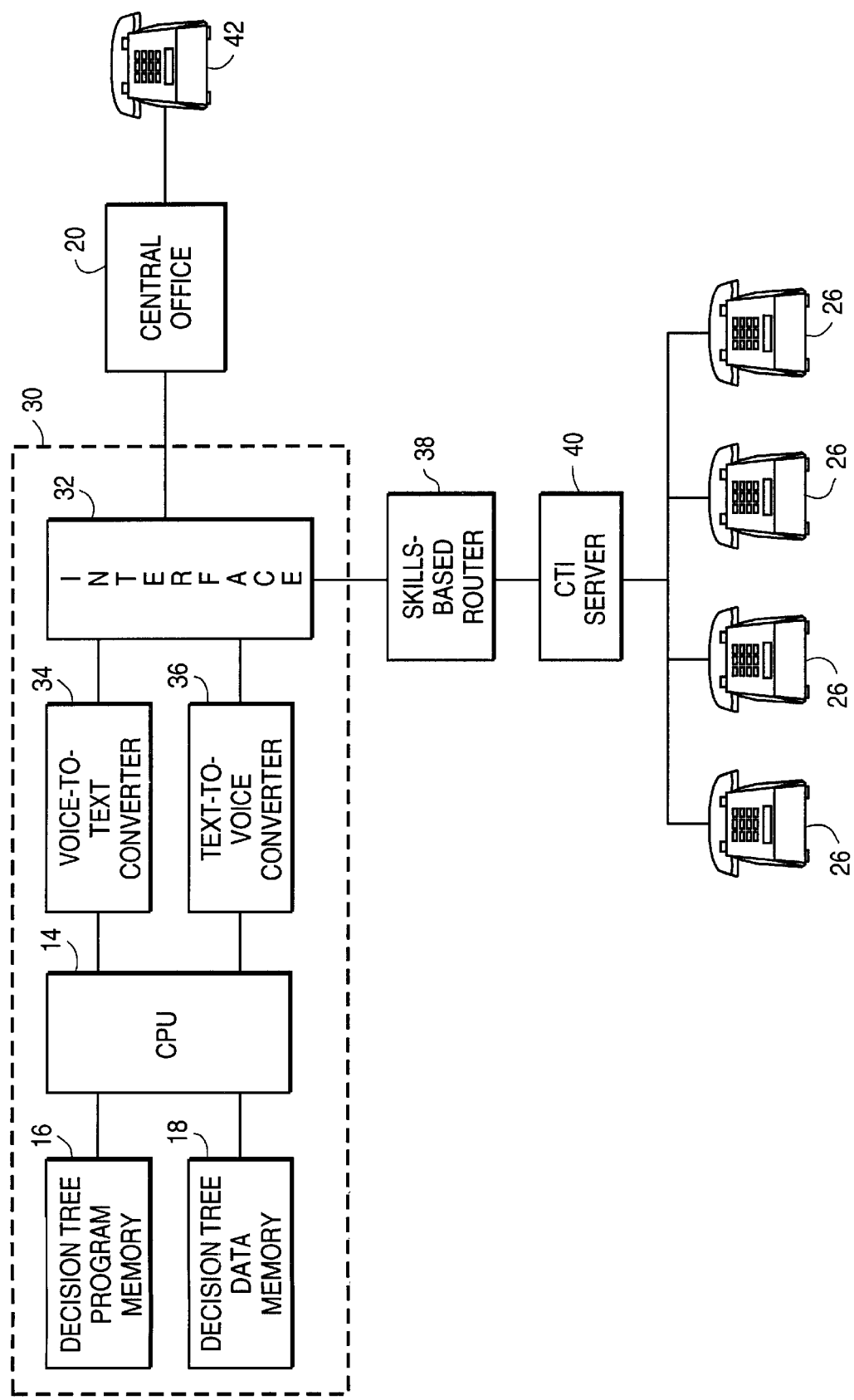
FIG. 2 is an alternative embodiment of the interactive decision tree system of FIG. 1 wherein the interactive decision tree system is connected to a user via a telecommunications link.

With reference to FIG. 2, an alternative embodiment of the invention is shown wherein a user-operated telephone 42 is connected to an interactive decision tree system 30 via a central office 20. Any telephone network can be utilized to connect the user-operated telephone to the interactive decision tree system 30 including, but not limited to, an analog telephone network, an ISDN, and a T-1 carrier and an IP telephony network. The system includes an interface 32 which connects to the central office and is connected to the CPU 14 via a voice-to-text converter 34. The voice-to-text converter converts an oral description of a problem transmitted by the user from the user-operated telephone 42 into a text description for analysis by the CPU 14. The CPU 14 is connected to a decision tree program memory 16 storing a decision tree program executed by the CPU 14 and a decision tree data memory 18 for storing decision tree data accessed by the CPU 14 in executing the decision tree program. The CPU 14 is also connected to a text-to-voice converter 36 which stores digitized text data correlating to options of each node of the decision tree. The CPU 14 directs the text-to-voice converter to access text data representing the various options of a particular node and to convert the text data into corresponding voice signals. A skills-based router 38 connects the interface 32 to the service representative-operated telephones to route calls from users based upon skills of the various service representatives and the subject matter with which the user requires assistance.

The user initiates contact with the interactive decision tree system 30 by placing a call to the interactive decision tree system 30 from the user-operated telephone 42. Upon receiving the phone call from the central office 20 or, in the IP telephony embodiment, a wide area network (WAN), the interface 32 transmits a message to the CPU 14 noting the incoming call. The CPU 14 responds by accessing an address from the data memory 18 for text files for the first node of the decision tree stored in the text-to-voice converter 36. The CPU 14 transmits the address together with instructions to the text-to-voice converter 36 to access the text files for the first node, to convert the files to voice signals, and to transmit the voice signals to the interface for transmission to the user-operated telephone 42. The first voice message transmitted by the text-to-voice converter 36 includes a prompt for the user to provide an oral description of the problem for which a solution is sought through interaction with the interactive decision tree system 30. Voice messages also include prompts for the user to chose an option by using the telephone keypad to transmit a dual tone multi-frequency (DTMF) signal associated with a one of the options of the node. The DTMF signal then causes the interactive decision tree system to transmit a subsequent message containing options for a subsequent node of the decision tree. This process continues until the user reaches a node providing a desired service, or until the user disconnects from the system.

The voice-to-text converter 34 enables the user to provide an oral description of a problem which the voice-to-text converter converts to a text description. The voice-to-text converter transmits the text description to the CPU 14 which performs a keyword search of files stored in the data memory 18 which contain descriptions of each node in the decision tree. The data memory also stores the addresses of the same node description files stored in memory of the text-to-voice converter 36. The CPU 14 transmits the addresses of node description files determined to be a match for the text description together with instructions to convert the files to voice signals for transmission to the user. The message containing the node descriptions also prompts the user to choose one of the nodes as an entry point in the decision tree. Subsequent messages from the interactive decision tree 30 also include an option to perform a second free-text analysis to enable the user to reconnect to another node in the decision tree.

The interactive decision tree provides the user with an identification which enables the user to reconnect to the decision tree at a node last visited by the user on a previous visit. As in the IWBS and the interactive e-mail embodiments, several options are available for reconnecting the user to a previously visited node. One technique involves transmitting a node identifier upon a disconnection request by the user. Alternatively, the user is assigned a user identification either at the outset of communication with the interactive decision tree system 30 or just prior to disconnecting based on a calling line identity (CLI), an automatic number identification (ANI), or a telephone number of a calling terminal. The user identification is stored in the data memory 18. When the user communicates the intent to disconnect from the system, the CPU 14 stores a node identifier in the data memory 18 corresponding to the last node visited by the user. Upon establishing a second connection with the system 30, the interface 32 automatically recognizes the user identification and transmits the user identification data to the CPU 14 which searches the data memory 18 for a corresponding node identifier. Upon locating a node identifier, the user is provided the option of connecting to the decision tree at the corresponding node. Optionally, the user is also assigned a task identifier to assist the user with multiple ongoing interactions in determining which node identifier is associated with which interaction.

The program memory 16 can be configured to direct the CPU 14 to execute a learning algorithm after the user has proceeded through the decision tree, reached a desired service at a particular node in the decision tree, and thereby solved the problem which necessitated the interaction with the interactive decision tree system. Learning algorithms can include state of the art algorithms such as provided in the "TestBench" diagnostic shell marketed by Carnegy Group, Inc. or well-known learning algorithms such as ID3 (see Quillian, M., "Discovering rules for large collections of examples: a case study", Expert Systems in the Micro-Electronic Age, Ed. D. Mitchie, Edinburgh University Press, 1979, pp.168–210), and its derivatives, artificial neural networks, or ID5 (see Nordhauser, B.; Langley, P., "A robust approach to numeric discovery", 1990, Proc. of the 7th Int. Conf. on Machine Learning, pp.411–418). Other Learning and discovery approaches can be used that are currently subsumed under the term data mining (see IEEE Expert, Intelligent Systems and Their Applications, "Data mining: getting at the nuggets", October 1996, IEEE Computer Society). Upon electing to disconnect from the decision tree, a prompt inquires whether the user has solved the problem. If the user responds affirmatively, then the CPU 14 accesses the decision tree path followed by the user from the data memory 18. The CPU 14 updates the decision tree program stored in the program memory 16 to reflect the effectiveness of the decision tree path followed by the user.

The interface 32 is connected to a skills-based router 38 to enable transfer of the user s call to a service representative with the requisite skills to assist with the problem for which the user seeks a solution. As previously discussed, the required skill set for each node is stored in the data memory 18 where it is accessed by the skills-based router to select a service representative capable of assisting the user. The final node in the decision tree visited by the user prior to transfer can be transmitted together with the path of the user to provide the service representative with advance user information. The customer is transferred to the service representative via a CTI server 28 which facilitates the connection of the user to the next available qualified service representative. Alternatively, a call back time is negotiated with the user. Call back negotiation techniques are well known in the art.

Figure 3:
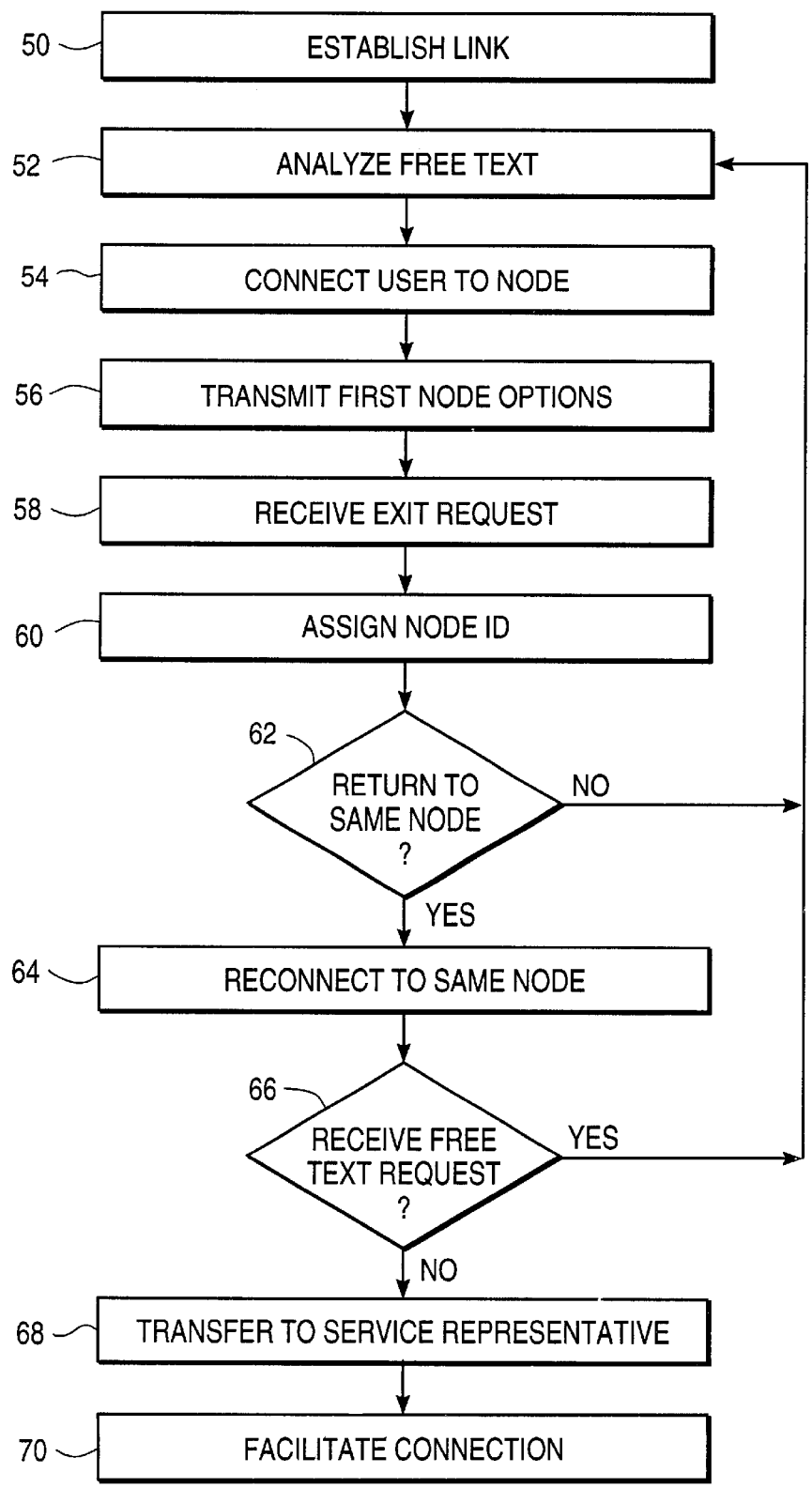
FIG. 3 is a process flow of a method for supporting a decision tree with placeholder capability utilizing the interactive decision tree system embodiment of FIGS. 1 and 2.

With reference to FIG. 3, a method for supporting a decision tree with a placeholder capability is shown which includes establishing a communications link between the user and the interactive decision tree system 10, 30 in step 50. As previously discussed, the connection can be over the Internet, as in the IWBS and the interactive e-mail embodiments, or the connection can be a telephonic connection as described in FIG. 2. In the Internet based embodiment the user establishes the connection by transmitting the interactive decision tree URL to the user server to access the decision tree server 12. In the e-mail embodiment the user transmits an e-mail message using the decision tree e-mail address. The CPU 14 then causes a return e-mail message to be transmitted containing the options provided in the first node. In the telephonic embodiment, the user dials the telephone number of the interactive decision tree system to establish the connection. The interface 32 signals the CPU 14 to alert the CPU 14 of the incoming call and to cause a first text message containing the options of the first node to be converted to voice signals by the text-to-voice converter 36 for transmission to the user.

Included in the first node is an option to have the interactive decision tree perform a free-text analysis to expedite the user through the decision tree in step 52. The CPU 14 performs a search of node description files stored in the data memory 18 to ascertain which of the node description files match the free-text description transmitted by the user. As discussed above, the telephonic embodiment requires a voice-to-text converter 34 positioned between the interface 32 and the CPU 14 to convert the oral description to a text description to enable the CPU 14 to perform the search. In step 54 the user is connected to a node based on the free-text search performed in step 52. The first node set of options is transmitted to the user in step 56. The user then navigates through the decision tree by selecting options at successive nodes. In step 58, the user selects the option of disconnecting from the interactive decision tree system 10, 30.

To enable the user to reconnect to the decision tree at the node which the user last visited, the user is assigned some form of identification in step 60. Three different types of identification are possible; a user identification, a node identifier, and a task identifier. If the interactive decision tree system 10, 30 does not store any identification, but instead transmits the identification to the user, then the user need only transmit the node identifier to the interactive decision tree system to re-enter the decision tree at the last visited node. If the interactive decision tree system stores the identification in the data memory 18, then the user is first assigned a user identification, preferably just prior to disconnecting from the last visited node. A node identifier is assigned concurrently with the user identification and both are stored in the data memory 18. Optionally, a task identifier is also assigned and stored in the data memory 18 to assist the user with multiple ongoing interactions with the decision tree system to remember which node identifier corresponds with which interaction.

Upon establishing a second connection with the interactive decision tree system, the user is given the option of re-entering the decision tree at a node corresponding to a node identifier in step 62. If the user declines the option, the user returns to step 52 to perform a second free-text analysis. Alternatively the user might choose to enter the decision tree at the root node. If the user elects to enter the decision tree utilizing the node identifier, then the interactive decision tree system connects the user to the decision tree at the last visited node in step 64.

At each node in the decision tree the user is given the option of performing a second free-text analysis to relocate within the decision tree, hopefully to a site more pertinent to the user s problem. In step 66 the decision tree system determines whether a second free-text analysis request has been transmitted by the user. If a second request has been transmitted, then the user returns to step 52 and enters a second free-text description of the user problem for analysis.

If no second free-text analysis request is entered, the user continues to navigate through the decision tree until the user disconnects from the system or requests to be transferred to a service representative. If the user selects the option to transfer to a service representative in step 68, then the user decision tree path and the node identifier are transmitted to a service representative utilizing a skills-based router 38. Subsequently, several different options exist for facilitating a connection between the user and the service representative in step 70. A call back time can be negotiated between the user and the service representative. In the interactive e-mail embodiment of the interactive decision tree system 10 the service representative can transmit an e-mail message to the user, and in the IWBS embodiment information can be pushed back to the user. Alternatively, the decision tree server 12 can establish an IP telephony connection between the user and the service representative supporting teleconferencing capabilities. In the telephonic embodiment, in addition to the call back negotiation option, the user can be transferred to the service representative via the skills-based router 38 which places the user in a queue for the next available qualified service representative.

The above-described invention enables a user of an interactive decision tree to reconnect to a last visited node in the decision tree automatically upon presentation of a node identifier corresponding to the last visited node. Advantageously, there is no requirement that more than a threshold number of visits to a node have been made by the visitor in order to advance the user directly to the last visited node. Consequently, the interactive decision tree system need not be configured to monitor the number of visits made to each node by the user. Moreover, the decision tree system is not required to be configured to perform a threshold analysis prior to advancing the user to the last visited node.

What is claimed is:

1. A method for implementing an interactive decision tree protocol, comprising the steps of:

accepting a first request from a user to establish a first bidirectional communications link;

connecting said user to an interactive decision tree-based expert unit supporting a decision tree;

transmitting to said user a series of option sets via said bidirectional communications link, each option within one of said option sets determining a subsequent set of options, each option set defining a node on said decision tree, and an assembly of all interrelated option sets defining said decision tree;

receiving a request from said user to exit said decision tree;

assigning a decision tree node identifier to said user, said decision tree node identifier being indicative of a last node visited by said user in said decision tree prior to said exit request;

accepting a subsequent request from said user to re-enter said decision tree via said expert unit; and reconnecting said user to said last node in said decision tree based solely upon said decision tree node identifier associated with said user identification.

2. The method of claim 1 further comprising the steps of assigning said user a user identification, storing said user identification and said node identifier in a memory, and accessing said user identification and said node identifier from said memory upon re-establishment of a communications link between said user and said expert unit.

3. The method of claim 1 further comprising the steps of receiving a free-text message from said user and performing a natural language analysis of said free-text message to determine a node within said decision tree to which to connect said user.

4. The method of claim 1 further comprising the step of transmitting data regarding communications between said user and said interactive decision tree-based expert unit to a service representative, said data including data indicative of a decision tree path followed by said user.

5. The method of claim 4 wherein said data transmitting step includes utilizing skill-based routing techniques to assure that said data is transferred to a service representative qualified to assist said user.

6. The method of claim 2 wherein said assigning steps include assigning a task identifier descriptive of said node identifier, said task identifier enabling said user to distinguish said node identifier assigned to said user during an interaction with said expert unit from other node identifiers assigned to said user during other interactions with said expert unit.

7. The method of claim 1 wherein said assigning steps include transmitting said node identifier to said user and wherein said step of reconnecting said user includes receiving said node identifier transmitted from said user.

8. A system for implementing an interactive decision tree protocol comprising:

an interactive decision tree-based expert unit having an input and an output, said input being enabled to receive user data from a remotely located user, said user data including a user identification that is specific to said user, said output being enabled to transmit system data that includes option data of a decision tree;

memory connected to said expert unit, said memory including stored system data and including said user identification and a node identifier associated with said user identification, said decision tree node identifier representing a node in said decision tree visited by said user prior to termination of a last communications link between said user and said expert unit;

means, in communicative contact with said memory, for accessing said decision tree node identifier from said memory based on said user identification; and means, responsive to said accessing means, for connecting said user to said node within said decision tree supported by said expert unit based solely on said decision tree node identifier associated with said user identification.

9. The system of claim 8 further comprising means connected to said interactive decision tree-based expert unit for transmitting communication history data between said user and said interactive decision tree-based expert unit to a service representative.

10. The system of claim 9 wherein said transmitting means includes a skill-based router for selecting a service representative based upon skills of said service representative.

11. The system of claim 10 wherein said interactive decision tree-based expert unit is enabled for at least one of data communication and telephony communication, said data communication including interactive web-based communication and interactive e-mail communication and said telephony communication including interactive voice response communication.

12. The system of claim 8 further comprising a server connected to said interactive decision tree-based expert unit enabled to facilitate establishment of a communications link between said user and said service representative via one of an Internet protocol (IP) telephony network and an Internet data network.

13. The system of claim 8 wherein said system data stored in said memory includes decision tree node description files, said expert unit input being enabled to receive a free-text description from said user, said expert unit being configured to perform natural language processing of said free-text description and to access decision tree node description files based upon said natural language processing of said free-text description, and said expert unit output being enabled to transmit said accessed decision tree node description files.

14. A method for implementing an interactive decision tree protocol comprising the steps of:

establishing a bidirectional communications link between a user and an interactive decision tree-based expert unit;

transmitting a prompt to said user via said bidirectional communications link requesting a free-text description of a problem for which said user seeks a solution through interaction with said expert unit;

analyzing said free-text description of said problem for which said user seeks a solution through interaction with said expert unit to determine a logical node within a decision tree supported by said expert unit to transfer said user;

connecting said user to said node in said decision tree based upon said analysis of said free-text description;

transmitting to said user a decision tree node identifier upon receiving a request from said user to exit said decision tree, said decision tree node identifier being indicative of a last node visited by said user in said decision tree prior to receiving said request to exit said decision tree; and in response to a request to re-establish communications, reconnecting said user to said decision tree at a node based solely upon said decision tree node identifier.

15. The method of claim 14 further comprising the step of updating said decision tree utilizing a learning algorithm based on previous solutions to user problems.

16. The method of claim 14 wherein said prompt transmitting step and said assigning decision tree node identifier step are both performed via one of a standard analog telephone network, a digital telephone network, and a data communications network.

17. The method of claim 14 further comprising the step of utilizing said interactive decision tree-based expert unit to establish a communications link between said user and said service representative via one of an IP telephony network and an Internet data network.

18. The method of claim 14 further comprising the steps of analyzing a second free-text description of said problem after said user has been connected to said decision tree and transferring said user to another node in said decision tree based upon keywords in said second free-text description.

19. The method of claim 14 further comprising the step of transmitting data regarding communications between said user and said expert unit to a service representative, said data including a decision tree path followed by said user.

20. The method of claim 19 wherein said transmitting data step includes utilizing skills-based routing techniques to assure that said data is transferred to a service representative qualified to assist said user.

* * * * *